(12) United States Patent
Van Den Berg et al.

(10) Patent No.: US 8,773,178 B2
(45) Date of Patent: Jul. 8, 2014

(54) COUPLING ARRANGEMENT FOR PHANTOM-MODE TRANSMISSION

(75) Inventors: Eric Van Den Berg, Antwerp (BE); Edmond Op De Beeck, Antwerp (BE)

(73) Assignee: Alcatel Lucent, Paris (FR)

( * ) Notice: Subject to any disclaimer, the term of this patent is extended or adjusted under 35 U.S.C. 154(b) by 0 days.

(21) Appl. No.: 13/816,856

(22) PCT Filed: Aug. 16, 2011

(86) PCT No.: PCT/EP2011/064115
§ 371 (c)(1),
(2), (4) Date: Feb. 26, 2013

(87) PCT Pub. No.: WO2012/034802
PCT Pub. Date: Mar. 22, 2012

(65) Prior Publication Data
US 2013/0162320 A1 Jun. 27, 2013

(30) Foreign Application Priority Data

Sep. 13, 2010 (EP) .................................... 10305979

(51) Int. Cl.
*H03K 3/00* (2006.01)
(52) U.S. Cl.
USPC ........................................ 327/108

(58) Field of Classification Search
USPC .................................................. 327/108, 112
See application file for complete search history.

(56) References Cited

U.S. PATENT DOCUMENTS

| 8,446,184 B2 * | 5/2013 | Van Der Goes et al. ...... 327/108 |
| 2004/0239374 A1 | 12/2004 | Hori |
| 2006/0268966 A1 | 11/2006 | Cioffi et al. |
| 2007/0132485 A1 | 6/2007 | Alon et al. |

OTHER PUBLICATIONS

Thaddeus Gabara, Phantom Mode Signaling in VLSI Systems, Advanced Research in VLSI, 2001. Mar. 14, 2001, pp. 88-100, XP010538448.
PCT/ISA/210 International Search Report for PCT/EP2011/064115 dated Aug. 16, 2011.

* cited by examiner

*Primary Examiner* — Hai L Nguyen
(74) *Attorney, Agent, or Firm* — Harness, Dickey & Pierce

(57) ABSTRACT

In accordance with an embodiment, the coupling arrangement includes adders for adding a common-mode signal to a differential-mode signal and amplification units for individually and evenly amplifying input signals present on their input terminals, thereby yielding amplified common-and-differential-mode signals. Coupling units with capacitive coupling are configured to pass the amplified common-and-differential-mode signals towards a wire pair.

5 Claims, 4 Drawing Sheets

COUPLING ARRANGEMENT FOR PHANTOM-MODE TRANSMISSION

TECHNICAL FIELD OF THE INVENTION

The present invention relates to phantom-mode transmission over a wired loop plant comprising a first wire pair and a second wire-pair, and more specifically to a coupling arrangement for coupling transmitters for phantom-mode transmission over the wired loop plant.

TECHNICAL BACKGROUND OF THE INVENTION

In order to increase the achievable data rates for Digital Subscriber Line (DSL) services, multi-line ADSL modulation was presented in U.S. Pat. No. 6,507,608. It describes the use of the so called phantom mode for transmission or reception of data signals. A central office equipment, such as a Digital Subscriber Line Access Multiplexer (DSLAM), provides DSL services to a subscriber over a first and a second twisted pair (also called DSL bonding), as well as over a virtual (or phantom) channel defined by the difference in common-mode voltages between the first and second twisted pairs. The Customer Premises Equipment (CPE) at the subscriber's premises is coupled to the first and second twisted pair by a first and second transformer respectively. A third transformer is coupled to the center taps of the secondary windings of the first and second transformer to create said phantom channel. The first and second twisted pairs may be used for downstream communication, while upstream communications are transmitted via the phantom channel. Alternatively, all three available channels can be used in frequency division duplexing, i.e. for both upstream and downstream communication.

An alternative embodiment of phantom-mode transmission is described in US patent application 2006/268966. In this application the phantom mode is defined as being the differential signal between a twisted pair and a common ground. However, providing such phantom channel derived from a common ground is known to cause a large amount of egress noise and to be highly susceptible to ingress.

The prior art coupling arrangement for phantom-mode transmission is now described with reference to FIGS. 1 and 2 wherein:

FIG. 1 represents a typical coupling arrangement for coupling a transmitter to a transmission line, and FIG. 2 represents a typical coupling arrangement for coupling three transmitters over two transmission lines using phantom-mode transmission.

There is seen in FIG. 1 a typical coupling arrangement for coupling a transmitter A to a transmission line L1.

The transmitter A comprises, as an illustrative embodiment, a Digital Signal Processor (DSP) DSPA for digitally encoding a data stream into data symbols to be transmitted over the line L1. The data stream is typically encoded in the frequency domain over a plurality of carriers (or tones), e.g. by means of Quadrature Amplitude Modulation (QAM). The transmit data symbols are fed towards a Digital-to-Analog Converter (DAC) DACA as digital time-domain samples. The time-domain samples are fed through a data bus comprising n lines, with n denoting the number of bits used for quantifying the individual samples.

The DAC DACA converts the digital samples into an analogue differential signal comprising two complementary and fully-balanced signals denoted as +VA and −VA. The differential signal is fed to a differential amplifier AMPA with high Common Mode Rejection Ratio (CMRR) through input terminals 1 and 2. The differential amplifier AMPA amplifies the difference between the two complementary signals +VA and −VA, namely 2 VA, and outputs two amplified complementary and fully-balanced signals +VA' and −VA' through output terminals 3 and 4.

The coupling unit COUP1A is a specific transformer arrangement comprising two terminals 101 and 102 coupled to the differential outputs 3 and 4 of the differential amplifier AMPA, and two terminals 103 and 104 coupled to the line L1.

The line L1 is a twisted copper pair comprising a first and second wire indistinctly referred to as the tip and ring of the line L1, and respectively denoted as L1-T and L1-R.

The coupling unit COUP1A comprises a first primary winding W1A, a first capacitor C1A and a second primary winding W2A serially coupled between the terminals 101 and 102, and a first secondary winding W3A, a second capacitor C2A and a second secondary winding W4A serially coupled between the terminals 103 and 104. The windings W1A, W2A, W3A and W4A are magnetically coupled to each other. The primary windings W1A and W2A are matched to each other, and so are the secondary windings W3A and W4A.

The coupling unit COUP1A is primarily for passing the amplified differential signal towards the line L1, and yields two complementary and fully-balanced signals +VA" and −VA" over the line L1.

The coupling unit COUP1A is for further isolating the transceiver circuitry from any DC component present over the line L1.

Also, any common-mode signals present on the differential amplifier output (mostly on account of component mismatches within the differential amplifier) is fully rejected by the transformer arrangement as they do not yield any current over the primary windings.

Finally, the combination of the capacitor CIA with the mutually-coupled inductors W1A/W3A and W2A/W4A and the further capacitor C2A forms a third-order high-pass filter, e.g. for filtering out any unwanted signals present in the Plain Old Telephony Service (POTS) frequency band.

There is now seen in FIG. 2 a typical coupling arrangement for coupling three transmitters A, B and C over two transmission lines L1 and L2 using phantom-mode transmission.

The transmitters A and B are respectively coupled to the lines L1 and L2 as aforementioned in FIG. 1 with alike reference numerals.

The coupling unit COUP1A, respectively COUP1B, has been slightly modified with the single capacitor C2A, respectively C2B, replaced by two serially-coupled matched capacitors with total equivalent capacitance, and with a further terminal 5, respectively 15, coupled to the inter-connection track between the two capacitors. The resulting coupling units are denoted as COUP1A' and COUP1B' respectively.

The third transmitter C produces two complementary and fully-balanced signal +VC and −VC to be added as common-mode signals to both the tip and ring of lines L1 and L2 respectively. As the transformer arrangement does not pass common-mode signals, the terminals 123 and 124 of the coupling unit COUP1C are connected to the terminals 5 and 15 respectively, and evenly add to both the tip and ring of the lines L1 and L2 by means of the two serial capacitors, thereby yielding +VA"+VC" and −VA"+VC" on line L1, and +VB"−VC" and −VB"−VC" on line L2.

The disclosed coupling arrangement is disadvantageous in that all those components require board space, limiting the total number of lines that can be equipped on a line termination unit, and in that the total Bill Of Material (BOM) for phantom-mode transmission is increased.

An additional drawback of the known coupling arrangement is that the power consumed by the third amplifier AMP1C is equal to that of the two other amplifiers AMP1A and AMP1B.

SUMMARY OF THE INVENTION

It is an object of the present invention to provide a cheaper and more compact design for phantom-mode transmission.

In accordance with a first aspect of the invention, a coupling arrangement for coupling transmitters to a wired loop plant comprises:

- a first amplification unit with a first pair of input terminals to be fed with a first differential-mode signal from a first transmitter, and configured to output a first amplified differential-mode signal onto a first pair of output terminals,
- a second amplification unit with a second pair of input terminals to be fed with a second differential-mode signal from a second transmitter, and configured to output a second amplified differential-mode signal onto a second pair of output terminals,
- a first coupling unit with a third pair of input terminals coupled to said first pair of output terminals, and configured to pass said first amplified differential-mode signal towards a third pair of output terminals to be coupled to a first wire pair,
- a second coupling unit with a fourth pair of input terminals coupled to said second pair of output terminals, and configured to pass said second amplified differential-mode signal towards a fourth pair of output terminals to be coupled to a second wire pair, wherein said coupling arrangement further comprises:

- a first adder configured to add a first common signal to said first differential-mode signal, thereby yielding a first common-and-differential-mode signal,
- a second adder configured to add a second common signal that is complementary of said first common signal to said second differential-mode signal, thereby yielding a second common-and-differential-mode signal, wherein said first and second amplification units are further configured to individually and evenly amplify input signals present on respective ones of their input terminals, thereby yielding first and second amplified common-and-differential-mode signals onto said first and second pairs of output terminals respectively, and wherein said first and second coupling units comprise capacitive couplings between respective ones of their input and output terminals, thereby passing said first and second amplified common-and-differential-mode signals towards said first and second wire pairs respectively.

By adding the common-mode signal to the complementary differential signals before the amplification stage, and by individually and equally amplifying each of the two signals so as both common-mode and differential-mode signals are amplified (versus differential amplifiers that only amplify the difference between their two input terminals while rejecting any common-mode signals present on both inputs), and further by capacitive coupling of the amplifier outputs to the line's tip and ring, one greatly reduces the number of lumped components used for the line drivers on the Printed Board Assembly (PBA), thereby reducing the BOM of the line termination units, and allowing an increase of the line density per equipment while further supporting phantom-mode transmission.

Also, as it will be set forth further in the description, the total power consumed by such a coupling arrangement is substantially decreased.

In one embodiment of the invention, said first and second common signals correspond to a third differential-mode signal from a third transmitter.

The adders have a first input terminal coupled to an output terminal of the regular transmitter and a second input terminal coupled to an output terminal of the phantom-mode transmitter. Both the regular and phantom-mode transmitters produce fully balanced differential signals.

In one embodiment of the invention, said first and second adders form part of said first and second transmitters respectively, and said first and second transmitters are further configured to directly output said first and second common-and-differential-mode signals respectively.

In this embodiment, the output of the phantom-mode transmitter is added in the digital domain to the differential-mode signal as a common-mode signal, thereby yielding unbalanced signals at the outputs of the first and second transmitters comprising a common-mode component for phantom-mode transmission.

This embodiment is particularly advantageous in that the DAC stage is no longer needed for the phantom-mode transmitter, and in that the BOM and the consumed power are reduced at a further extent.

Further characterizing embodiments are mentioned in the appended claims.

BRIEF DESCRIPTION OF THE DRAWINGS

The above and other objects and features of the invention will become more apparent and the invention itself will be best understood by referring to the following description of an embodiment taken in conjunction with FIGS. 3 and 4, wherein.

DETAILED DESCRIPTION OF THE INVENTION

Figure 3:
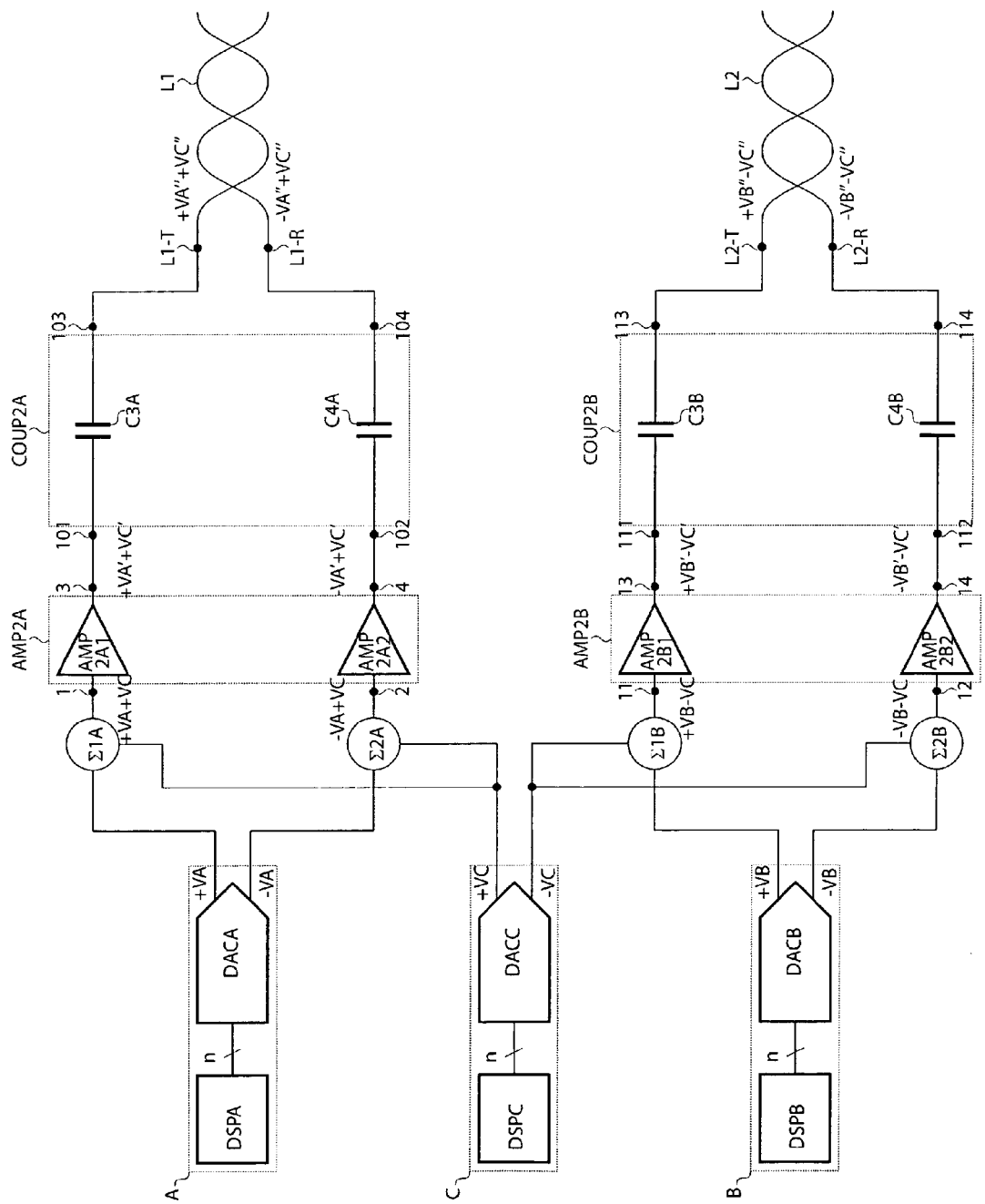
FIG. 3 represents a first coupling arrangement according to the invention.

There is seen in FIG. 3 a first coupling arrangement according to the invention with:

- a first transmit path for coupling a first transmitter A to a first transmission line L1,
- a second transmit path for coupling a second transmitter B to a second transmission line L2, and
- a third transmit path for coupling a third transmitter C for phantom-mode transmission over both lines L1 and L2.

The coupling arrangement may also comprise corresponding receive paths (not shown) for receiving both differential-mode and common-mode signals from the lines L1 and L2, and for feeding the received signals to respective receivers for further handling (amplifying, demodulating, decoding, etc).

The three transmitters A, B and C are shown as comprising DSPs DSPA, DSPB and DSPC respectively coupled to DACs DACA, DACB and DACC, but the present invention should not be limited to that specific embodiment and may apply indistinctly to alternative analog or digital transmitter implementations.

The transmitters A, B and C output differential-mode and fully-balanced signals $(+VA(t), -VA(t))$, $(+VB(t), -VB(t))$ and $(+VC(t), -VC(t))$ respectively onto output terminal pairs, wherein t denotes the time-dependence of the signals (the time dependence will be omitted in the following).

The coupling arrangement comprises the following functional blocks:
- four adders Σ1A, Σ2A, Σ1B and Σ2B, each with two input terminals and one output terminal,
- a first amplification unit AMP2A with two input terminals 1 and 2 and two output terminals 3 and 4,
- a second amplification unit AMP2B with two input terminals 11 and 12 and two output terminals 13 and 14,
- a first coupling unit COUP2A with two input terminals 101 and 102 and two output terminals 103 and 104, and
- a second coupling unit COUP2B with two input terminals 111 and 112 and two output terminals 113 and 114.

The two output terminals of the transmitter A are coupled to an input terminal of the two adders Σ1A and Σ2A respectively. The two output terminals of the transmitter B are coupled to an input terminal of the two adders Σ1B and Σ2B respectively. The first output terminal of the transmitter C is coupled to an input terminal of the two adders Σ1A and Σ2A, and the second output terminal of the transmitter C is coupled to an input terminal of the two adders Σ1B and Σ2B.

The adders Σ1A, Σ2A, Σ1B and Σ2B are for adding together the signals present on their two input terminals, and to output the sum of the two signals onto the output terminal. Implementations of the adders Σ1A, Σ2A, Σ1B and Σ2B by means of basic electronics are well know in the art.

The output terminals of the adders Σ1A, Σ2A, Σ1B and Σ2B are respectively coupled to the input terminals 1, 2, 11 and 12 of the amplification units AMP2A and AMP2B, and put out signals +VA+VC, −VA+VC, +VB−VC and −VB−VC respectively.

The output terminals 3, 4, 13 and 14 of the amplification units AMP2A and AMP2B are respectively coupled to the input terminals 101, 102, 111 and 112 of the coupling units COUP2A and COUP2B. The output terminals 103 and 104 of the coupling unit COUP2A are respectively coupled to the tip L1-T and the ring L1-R of the line L1. The output terminals 113 and 114 of the coupling unit COUP2A are respectively coupled to the tip L2-T and ring L2-R of the line L2.

The amplification unit AMP2A and AMP2B are configured to amplify both common-mode and differential-mode signals applied to their respective pair of input terminals (1, 2) and (11, 12). This is achieved by individually amplifying each signal component with substantially the same amplification gain.

Therefore, the first amplification unit AMP2A comprises a first amplifier AMP2A1 between the input terminal 1 and the output terminal 3 for amplifying the signal +VA+VC put out by the first adder Σ1A, thereby yielding +VA'+VC' as amplified signal, and a second amplifier AMP2A2 between the input terminal 2 and the output terminal 4 for amplifying the signal −VA+VC put out by the second adder Σ2A, thereby yielding −VA'+VC' as amplified signal.

Similarly, the second amplification unit AMP2B comprises a third amplifier AMP2B1 between the input terminal 11 and the output terminal 13 for amplifying the signal +VB−VC put out by the third adder Σ1B, thereby yielding +VB'−VC' as amplified signal, and a fourth amplifier AMP2B2 between the input terminal 12 and the output terminal 14 for amplifying the signal −VB−VC put out by the fourth adder Σ2B, thereby yielding −VB'−VC' as amplified signal.

Let V1(t) and V2(t) denote any two signals, each one driving one wire of a wire pair, such as the tip and the ring of a subscriber loop.

The signals over each wire can be decomposed into a differential-mode signal Vd(t) and a common-mode signal Vc(t):

$$V1(t) = Vc(t) + Vd(t)/2 \qquad (1)$$

$$V2(t) = Vc(t) - Vd(t)/2 \qquad (2)$$

wherein:

$$Vd(t) = V1(t) - V2(t) \qquad (3),$$

$$Vc(t) = \frac{V1(t) + V2(t)}{2}. \qquad (4)$$

Let G denote the common gain factor of the amplifiers AMP2A1, AMP2A2, AMP2B1 and AMP2B2. Let (V1c, V1d) and (V1c', V1d') denote the common-mode and differential-mode signals respectively present on the input terminal pair (1, 2) and the output terminal pair (3, 4) of the first amplification unit AMP2A. Let (V2c, V2d) and (V2c', V2d') denote the common-mode and differential-mode signals respectively present on the input terminal pair (11, 12) and the output terminal pair (13, 14) of the second amplification unit AMP2B. We have:

$$V1d = (VA + VC) - (-VA + VC) = 2 \cdot VA \qquad (5),$$

$$V1c = ((VA + VC) + (-VA + VC))/2 = VC \qquad (6),$$

$$V2d = (VB - VC) - (-VB - VC) = 2 \cdot VB \qquad (7),$$

$$V2c = ((VB - VC) + (-VB - VC))/2 = -VC \qquad (8).$$

Similarly, we have:

$$\begin{aligned} V1d' &= (VA' + VC') - (-VA' + VC') = 2 \cdot VA' \\ &= G \cdot (VA + VC) - G \cdot (-VA + VC) \\ &= G \cdot ((VA + VC) - (-VA + VC)) \\ &= G \cdot V1d, \end{aligned} \qquad (9)$$

$$\begin{aligned} V1c' &= ((VA' + VC') + (-VA' + VC'))/2 = VC' \\ &= (G \cdot (VA + VC) + G \cdot (-VA + VC))/2 \\ &= G \cdot ((VA + VC) + (-VA + VC)/2) \\ &= G \cdot V1c, \end{aligned} \qquad (10)$$

$$\begin{aligned} V2d' &= (VB' - VC') - (-VB' - VC') = 2 \cdot VB' \\ &= G \cdot (VB - VC) - G \cdot (-VB - VC) \\ &= G \cdot ((VB - VC) - (-VB - VC)) \\ &= G \cdot V2d, \end{aligned} \qquad (11)$$

$$\begin{aligned} V2c' &= ((VB' - VC') + (-VB' - VC'))/2 = -VC' \\ &= (G \cdot (VB - VC) + G \cdot (-VB - VC))/2 \\ &= G \cdot ((VB - VC) + (-VB - VC)/2) \\ &= G \cdot V2c. \end{aligned} \qquad (12)$$

Thus, both common-mode and differential-mode signals present on the input terminal pairs of the amplification unit AMP2A and AMP2B are amplified with the same gain G.

The gain factors of the individual amplifiers AMP2A1, AMP2A2, AMP2B1 and AMP2B2 are not necessarily equal, e.g. on account of component mismatches, but they should match as close as possible so as to achieve high common-mode-to-differential-mode and differential-mode-to-common-mode rejection ratios.

Indeed, let G1 and G2 denote the respective gain factors of the amplifiers AMP2A1 and AMP2A2. We can write G2=G1+ΔG, and:

$$V1d' = 2 \cdot VA' = G1 \cdot (VA + VC) - (G1 + \Delta G) \cdot (-VA + VC) \quad (13)$$
$$= G1 \cdot ((VA + VC) - (-VA + VC)) + \Delta G \cdot (VA - VC)$$
$$= G1 \cdot V1d + \Delta G \cdot (V1d/2 - V1c)$$
$$= (G1 + \Delta G/2) \cdot V1d - \Delta G \cdot V1c,$$

$$V1c' = VC' = (G1 \cdot (VA + VC) + (G1 + \Delta G) \cdot (-VA + VC))/2 \quad (14)$$
$$= G1 \cdot ((VA + VC) + (-VA + VC))/2 + \Delta G/2 \cdot (VC - VA)$$
$$= (G1 + \Delta G/2) \cdot V1c - \Delta G/4 \cdot V1d$$

As one can see, the differential-mode voltage V1d' output by the amplification unit AMP2A depends on both the differential-mode and common-mode input voltages. similarly, the common-mode voltage V1c' output by the amplification unit AMP2A depends on both the common-mode and differential-mode input voltages.

Consequently, one should tend to reduce ΔG, i.e. the gain mismatching between the two amplifiers AMP2A1 and AMP2A2, so as to decrease the common-mode-to-differential-mode and differential-mode-to-common-mode couplings of the amplification unit AMP2A.

The same reasoning applies mutatis mutandis to the second amplification unit AMP2B.

The coupling units COUP2A and COUP2B are configured for passing both common-mode and differential-mode signals from their input terminals towards their output terminals. This is achieved by means of capacitive coupling.

The coupling unit COUP2A comprises a first capacitor C3A between the input terminal 101 and the output terminal 103, and a second capacitor C4A between the input terminal 102 and the output terminal 104.

Similarly, the coupling unit COUP2B comprises a third capacitor C3B between the input terminal 111 and the output terminal 113, and a second capacitor C4B between the input terminal 112 and the output terminal 114.

The capacitors C3A, C4A, C3B and C4B behave as a first-order high-pass filter for the respective signals +VA'+VC', -VA'+VC', +VB'-VC' and -VB'-VC' applied to the respective input terminals 101, 102, 111 and 112, thereby yielding filtered common-mode and differential-mode signals +VA"+VC", -VA"+VC", +VB"-VC" and -VB"-VC" on the respective output terminals 103, 104, 113 and 114.

Those filtered signals ultimately drives the tips and the rings of the lines L1 and L2.

Additional components, such as resistors and/or capacitors and/or inductors, can be added to the capacitors C3A, C4A, C3B and C4B, to improve the filter characteristics, e.g. to design a third-order high-pass filter for filtering out any unwanted low-frequency signal that might be present in the POTS band because of non-linearity in e.g. the amplification units AMP2A and AMP2B.

Common-mode-to-differential-mode and differential-mode-to-common-mode couplings exist in the final COUP2A capacitor-coupling stage too, mostly on account of C3A and C4A capacitance mismatch.

The impairments of the amplification and coupling stages can be dealt with by careful hardware design with perfectly matched components, and/or by means of a feedback loop or compensation circuit.

That part of the phantom channel signal that ultimately leaks into the regular channel on account of the aforementioned common-mode-to-differential-mode and differential-mode-to-common-mode couplings can be further canceled by signal pre-coding or signal post-processing over the regular channel, and vice-versa. A method for crosstalk cancellation between the regular and phantom channels is described in EP patent application 2091196 entitled "Method and Apparatus for DSL Communication".

Figure 4:
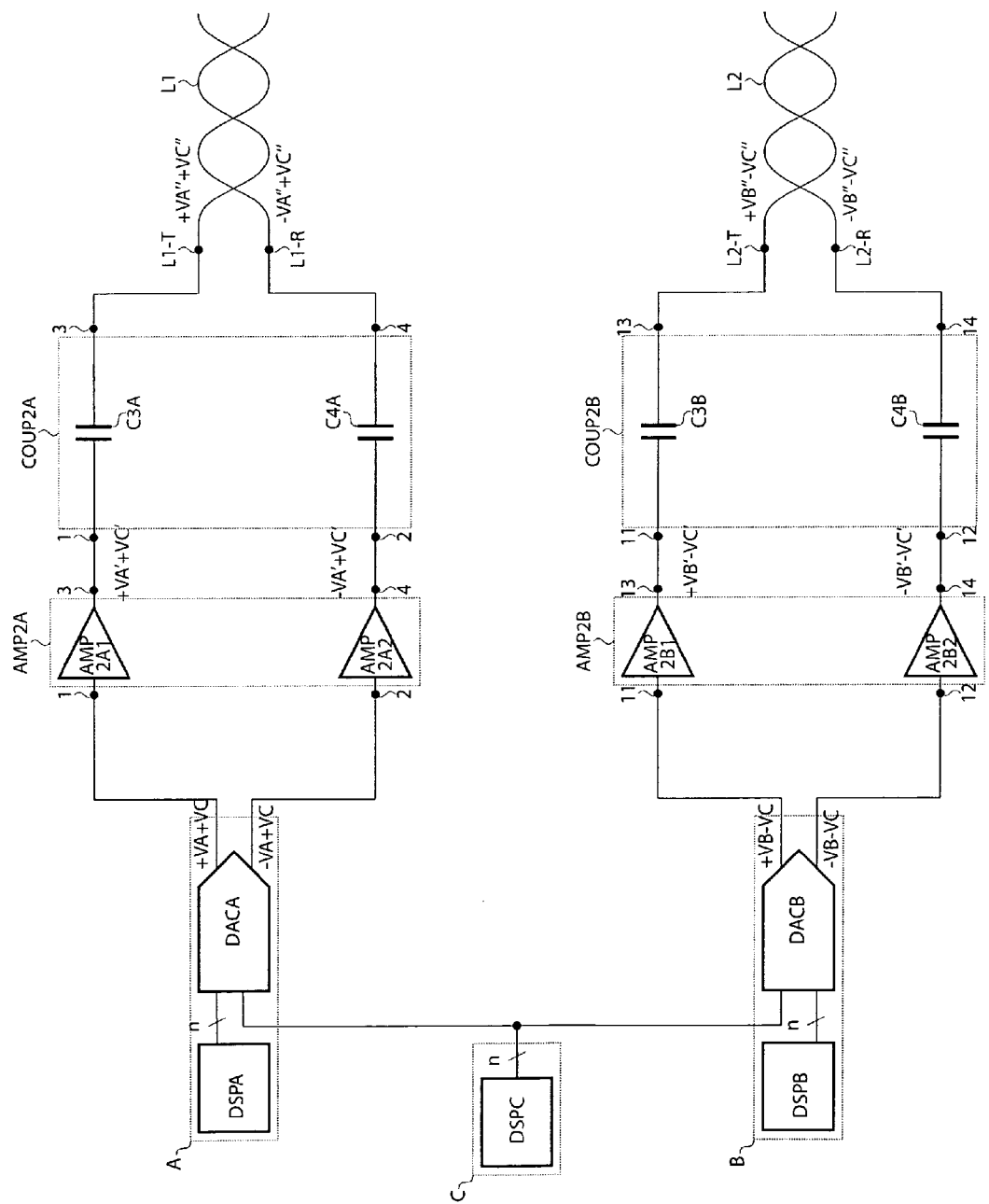
FIG. 4 represents a second coupling arrangement according to the invention.

There is seen in FIG. 4 a second embodiment of a coupling arrangement according to the invention, wherein the adders Σ1A, Σ2A, Σ1B and Σ2B have been advantageously moved within the transmitters A and B, and more specifically within the DACs DACA and DACB. The DAC of the transmitter C is no longer needed and can be taken out from the PBA, thereby saving extra cost.

More specifically, the DAC DACA comprises two input terminals and two output terminals, with a first input terminal coupled to DSPA's output and fed with first digital samples to be output as differential-mode signal on the output terminal pair, and a second input terminal coupled to DSPC's output and fed with second digital samples to be output as common-mode signal on the output terminal pair.

Similarly, the DAC DACB comprises two input terminals and two output terminals, with a first input terminal coupled to DSPB's output and fed with first digital samples to be output as differential-mode signal on the output terminal pair, and a second input terminal coupled to DSPC's output and fed with second digital samples to be inverted and output as common-mode signal on the output terminal pair.

In this embodiment, the DAC DACA is configured to produce two complementary digital signals from first samples, namely +VA and -VA, and to add second digital samples namely +VC, to each complementary digital signals before analog-to-digital conversion, thereby yielding an unbalanced and asymmetrical signal on the output terminal pair, namely +VA+VC and -VA+VC.

Similarly, the DAC DACB is configured to produce two complementary digital signals from first samples, namely +VB and -VB, and to invert and add second digital samples, namely -VC, to each complementary digital signals before analog-to-digital conversion, thereby yielding an unbalanced and asymmetrical signal on the output terminal pair, namely +VB-VC and -VB-VC.

The amplification units AMP2A and AMP2B and the coupling units COUP2A and COUP2B are left unchanged.

Figure 1:
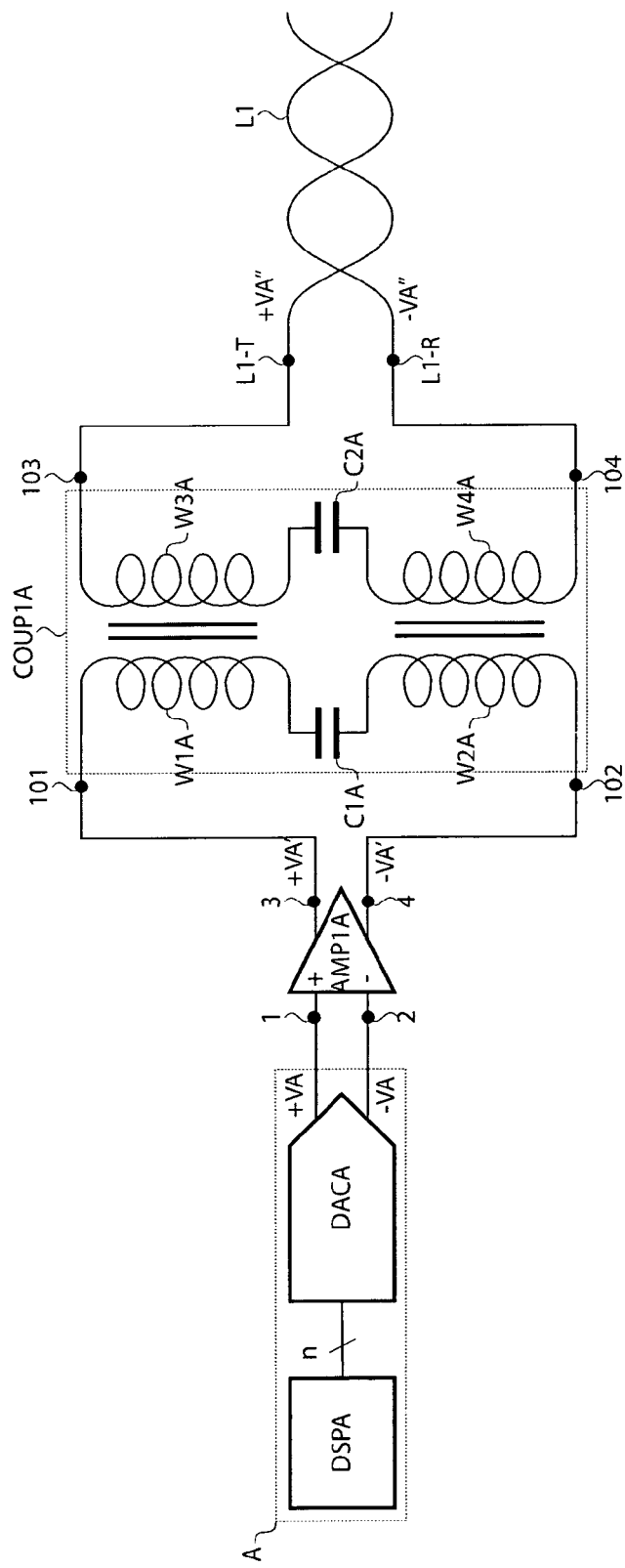
Figure 2:
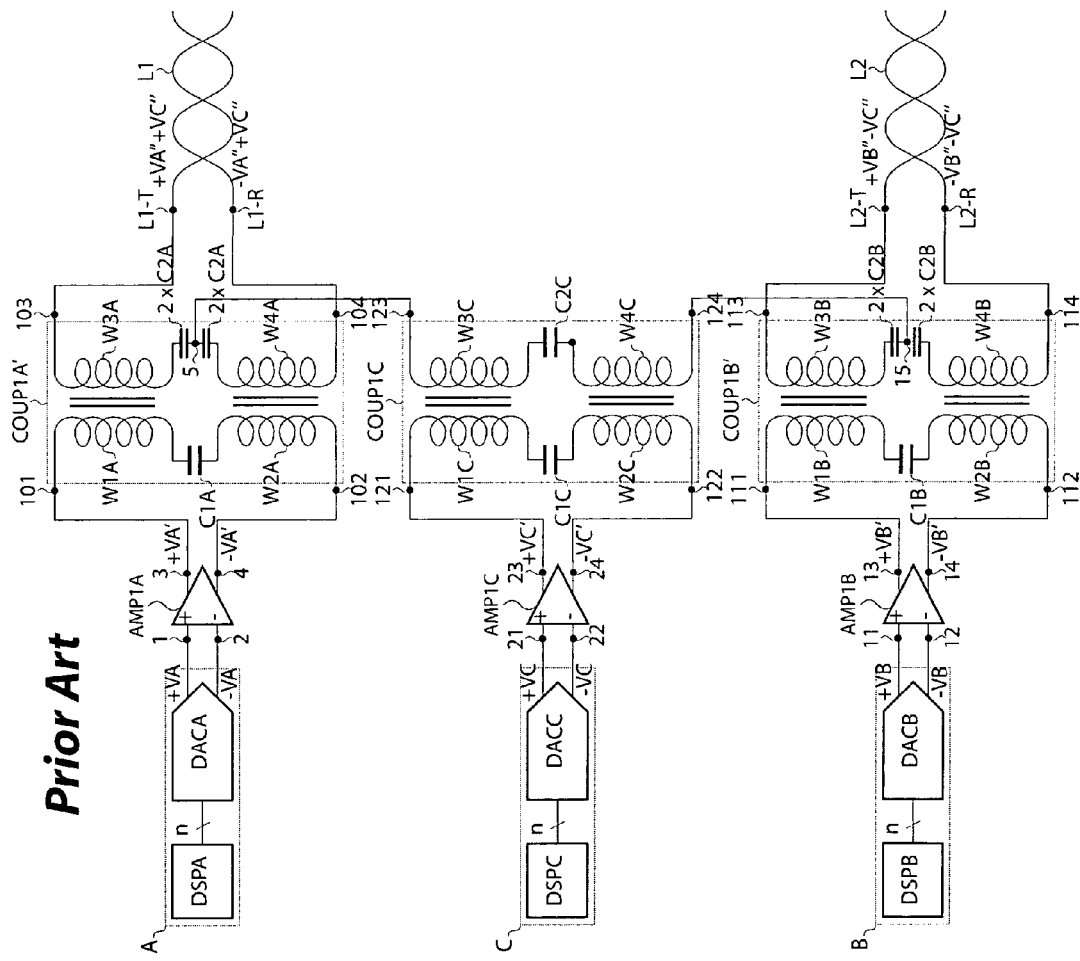

Prior art solutions use a complete transmission channel (DSPC processor, DACC converter and AMP1C amplifier in FIG. 2) for placing the differential signal as two complementary common-mode signals (+VC', -VC'), one on each twisted pair (L1 and L2).

These components consume power. Reducing the number of amplifiers and DACs, as per the invention, saves power.

The power saving achieved by reducing the number of amplifiers from 3 down to 2 (elimination of AMP1C) does however not save 33% of the power consumed by the amplifiers. The two remaining amplifiers (AMP1A and AMP1B) generating both the differential-mode and common-mode mode signals need to output more power and hence consume more power. For DSL applications, the supply voltage of a line driver must be sufficiently high to deliver crest peaks up to 5 or 6 times the Root Mean Square (RMS) power. These crest peaks are very rare, and probability that they will occur simultaneously on the differential channel ((+VA', -VA') or (VB',-VB')) and the phantom channel ((+VC', -VC')) can be ignored in function of the desired Bit Error Rate (BER). The power supply of an amplifier outputting both differential-mode and common-mode signals can therefore be limited to the supply voltage required to generate the sum of the RMS powers plus e.g. one crest peak. This would be around 120% of the supply voltage that would be required for a differential-mode signal only, and would yield a power reduction of minimum 20% for the amplifier section only. Also, a further power reduction can be achieved by eliminating the third DAC (DACC) as shown in the embodiment of FIG. 4.

A coupling arrangement according to the invention typically forms part of a line termination unit, which is a piece of equipment whereat transmission lines from subscriber premises terminate. This piece of equipment forms part of an access node for providing network access to subscribers. Examples of access nodes are a DSLAM, an Ethernet access bridge, an IP access or edge router, etc. The access node may reside at a central location (e.g., a central office), or at a remote location closer to subscriber premises (e.g., a street cabinet)

It is to be noticed that the term 'comprising' should not be interpreted as being restricted to the means listed thereafter. Thus, the scope of the expression 'a device comprising means A and B' should not be limited to devices consisting only of components A and B. It means that with respect to the present invention, the relevant components of the device are A and B.

It is to be further noticed that the term 'coupled' should not be interpreted as being restricted to direct connections only. Thus, the scope of the expression 'a device A coupled to a device B' should not be limited to devices or systems wherein an output of device A is directly connected to an input of device B, and/or vice-versa. It means that there exists a path between an output of A and an input of B, and/or vice-versa, which may be a path including other devices or means.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, a processor should not be construed to refer exclusively to hardware capable of executing software, and may implicitly include, without limitation, digital signal processor (DSP) hardware, network processor, application specific integrated circuit (ASIC), field programmable gate array (FPGA), etc. Other hardware, conventional and/or custom, such as read only memory (ROM), random access memory (RAM), and non volatile storage, may also be included.

The invention claimed is:

1. A coupling arrangement for coupling transmitters to a wired loop plant, and comprising:
    a first amplification unit with a first pair of input terminals to be fed with a first differential-mode signal from a first transmitter, and configured to output a first amplified differential-mode signal onto a first pair of output terminals,
    a second amplification unit with a second pair of input terminals to be fed with a second differential-mode signal from a second transmitter, and configured to output a second amplified differential-mode signal onto a second pair of output terminals,
    a first coupling unit with a third pair of input terminals coupled to said first pair of output terminals, and configured to pass said first amplified differential-mode signal towards a third pair of output terminals to be coupled to a first wire pair,
    a second coupling unit with a fourth pair of input terminals coupled to said second pair of output terminals, and configured to pass said second amplified differential-mode signal towards a fourth pair of output terminals to be coupled to a second wire pair, wherein said coupling arrangement further comprises:
    a first adder configured to add a first common signal to said first differential-mode signal, thereby yielding a first common-and-differential-mode signal,
    wherein said first and second amplification units are further configured to individually and evenly amplify input signals present on respective ones of their input terminals, thereby yielding first and second amplified common-and-differential-mode signals onto said first and second pairs of output terminals respectively, and wherein said first and second coupling units comprise capacitive couplings between respective ones of their input and output terminals, thereby passing said first and second amplified common-and-differential-mode signals towards said first and second wire pairs respectively.

2. A coupling arrangement according to claim 1, wherein said first and second common signals correspond to a third differential-mode signal from a third transmitter (c).

3. A coupling arrangement according to claim 1, wherein said first and second adders form part of said first and second transmitters respectively,
    and wherein said first and second transmitters are further configured to directly output said first and second common-and-differential-mode signals respectively.

4. A line termination unit including a coupling arrangement according to claim 1.

5. An access node including a coupling arrangement according to claim 1.

* * * * *